C. KAUFMANN.
PRIMER.
APPLICATION FILED SEPT. 27, 1913.
1,164,357.
Patented Dec. 14, 1915.
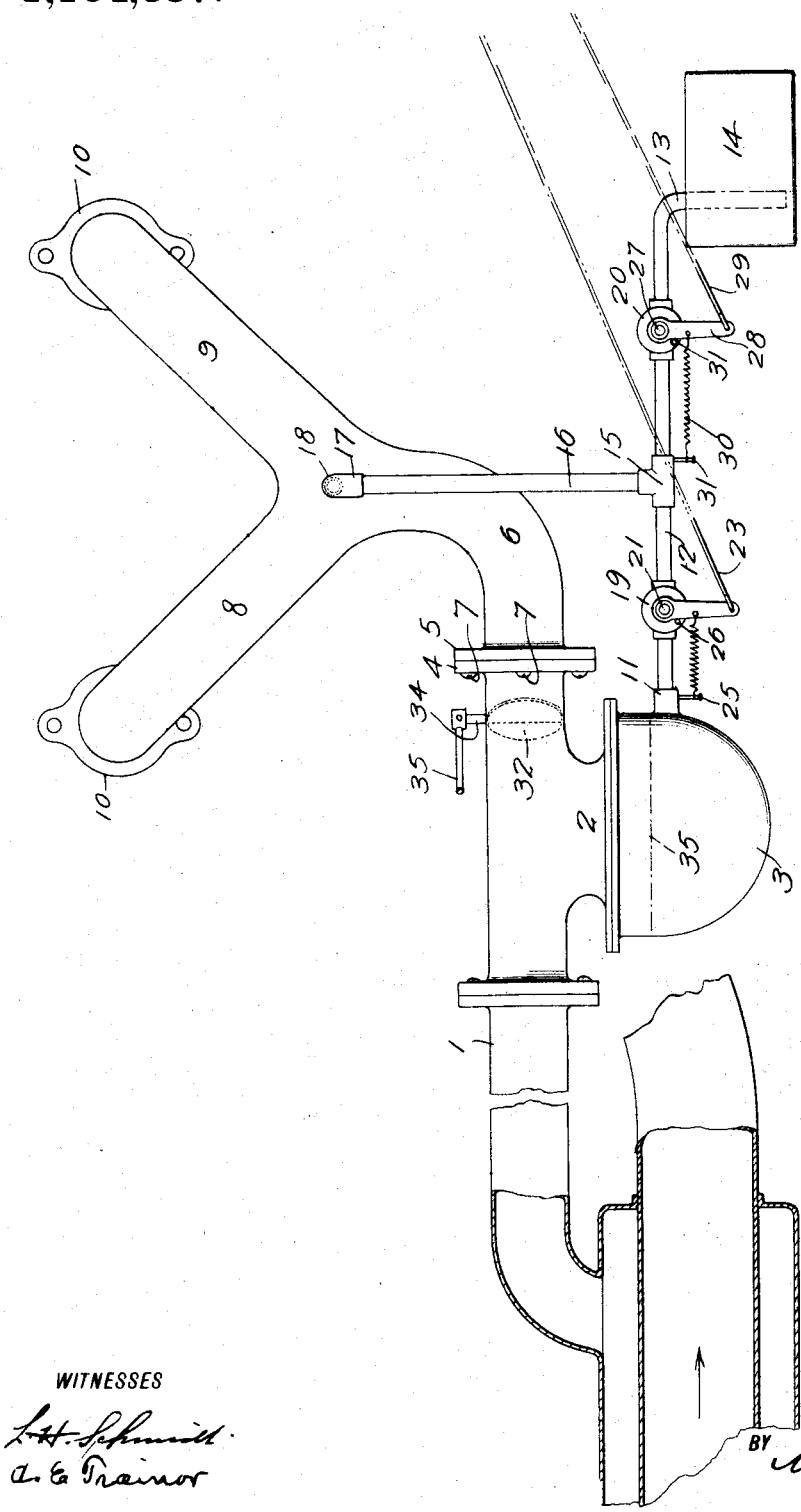
WITNESSES
INVENTOR
CHARLES KAUFMANN,
BY
ATTORNEYS

UNITED STATES PATENT OFFICE.

CHARLES KAUFMANN, OF SANTA ANA, CALIFORNIA.

PRIMER.

1,164,357.  Specification of Letters Patent.  Patented Dec. 14, 1915.

Application filed September 27, 1913. Serial No. 792,162.

*To all whom it may concern:*

Be it known that I, CHARLES KAUFMANN, a citizen of the United States, and a resident of Santa Ana, in the county of Orange and State of California, have invented a new and useful Improvement in Primers, of which the following is a specification.

My invention is an improvement in primers, and has for its object to provide mechanism of the character specified, for use in connection with explosion engines using distillate gasolene, alcohol or the like, and arranged between the carbureter and the engine, for assisting in the evaporation of the fuel when starting the engine, and wherein other mechanism is provided for permitting the use of a fuel evaporation at a lower temperature than the ordinary fuel, for starting the engine.

In the drawing is shown the priming mechanism in connection with the manifold of an engine.

In the present embodiment of the invention, a pipe 1 is provided, leading from the jacket which encircles or incloses the exhaust pipe of the engine, and the said pipe leads to the carbureter, which may be of any desired make. From the carbureter, the said pipe extends as shown at 6 to the manifold of the engine, communicating therewith by means of branch pipes 8 and 9, connected to the manifold as indicated at 10.

The carbureter 3 is provided with a lateral nipple 11, to which is connected a pipe 12, having at its outer end an elbow or depending portion 13 which extends near the bottom of a receptacle 14, for containing gasolene or the like for a purpose to be presently described.

A T 15 is interposed in the pipe 12 near the center thereof, and a pipe 16 is connected with the lateral branch of the T. The said pipe 16 extends upwardly to the junction of the branches 8 and 9 with the body 6 of the manifold at which point an elbow 17 is provided for connecting the upper end of the pipe 16 with the manifold.

A check valve 18 is arranged in the elbow 17, the said valve being in the present instance a ball valve, and arranged to permit free passage from the pipe 16 to the manifold and to prevent the return passage.

Valve casings 19 and 20 are interposed in the length of the pipe 12, the casing 19 being between the carbureter and the T 15, while the casing 20 is between the T 15 and the receptacle or reservoir 14.

The valve in the casing 19 controls the communication between the carbureter and the manifold, while the valve in the casing 20 controls the communication between the receptacle or reservoir 14 and the manifold. The valve 21 in the casing 19 is provided with a radial arm 22, and a link 23 is connected at one end to the arm. The other end of the link extends through the radiator or to a point adjacent to the driver, and a coil spring 24 is arranged between the arm 22 and a pin 25 on the outlet 11.

The spring 24 acts normally to hold the arm 22 at right angles to the pipe 12, and against a stop pin 26 on the valve casing. When the arm 22 is in such position, the valve is closed, closing the communication between the carbureter and the manifold through the pipes 12 and 16. The valve 27 in the casing 20 is provided with a radial arm 28, and a link 29 is connected at one end with the free end of the arm. The other end of the link extends through the radiator or in the same manner as the link 23 to a point adjacent to the driver to permit the driver to operate either valve from the seat or from in front of car. A coil spring 30 is arranged between the arm 28, and a pin 31 on the T 15, and the said spring holds the arm normally at right angles to the pipe 12 and in contact with a stop pin 31 on the valve casing. When the arm is in such position, the valve is closed, and the communication between the reservoir 14 and the manifold is also closed. Both valves are thus normally closed.

The throttle valve 32 is arranged in the pipe 1, near its junction with the manifold and between the carbureter and the manifold, the said valve having a stem 34, to which is connected the operating lever 35. By means of the said lever the communication between the carbureter and the manifold, by way of the pipe 1, may be controlled.

The fuel stands in the carbureter at the level of the dotted line 35, and it will be noted that the said level is just above the outlet 11, to which the pipe 12 is connected. In engines of the character specified, which use distillate or heavier fuel than gasolene as a fuel, it is necessary to prime the engine with gasolene, before it can be started. This is due to the fact that the heavier fuel evaporates at a higher temperature than the gasolene. With the present invention however, the engine may be primed with the ordinary fuel, that is, with distillate except in very cold weather, when gasolene is used.

The operation is as follows: The throttle valve 32 is first closed, and the valve 21 is opened by means of the link 23, and held open while the engine is turned over once or twice. The pipe 1 being closed, the suction caused by the turning over of the engine draws a stream of fuel from the carbureter through the pipes 12 and 16 to the manifold, and from thence to the engine. The valve 21 is then released, and the spring 24 closes the same. The throttle valve 32 is now opened and the engine is cranked, in the usual manner. When the sparking mechanism operates, the charge of fuel drawn into the engine is ignited, and the engine starts in the usual manner, drawing its fuel from the carbureter.

In very cold weather, the procedure is somewhat different. The throttle valve 32 is closed, and the valve 27 is opened by means of the link 29 and held open while the engine is turned over once. A stream of gasolene is thus drawn into the manifold from the reservoir 14, by way of the pipes 13 and 16. The valve 27 is now released, and the spring 30 closes the same. The throttle valve 32 is then opened and the engine is cranked in the usual manner.

The improvement may be applied to existing engines without any particular change. The portion of the carbureter shown is the fuel chamber, and the pipe 12 is connected to the said chamber below the level of the said fuel. The elbow 17 is connected with the manifold, and no other changes in the engine proper or its connections are necessary.

I claim:—

1. In an explosion engine, the combination with the manifold, a hot air pipe leading from a jacket around the exhaust pipe to the carbureter and having an extension for connection with the carbureter, the throttle valve in the said pipe between the carbureter and the manifold, a pipe leading horizontally from the fuel chamber of the carbureter below the level of the fuel in the said chamber, a reservoir for gasolene at the outer end of the pipe, said pipe having an elbow extending into the reservoir, a T interposed in the said pipe intermediate the ends thereof, a pipe connecting the T with the manifold at the junction of the branches with the body thereof, said pipe communicating with the manifold, a check valve in the said pipe for preventing return of the fuel from the manifold, and a valve casing interposed in the horizontal pipe on each side of the T, a valve in each casing, an arm extending radially from each valve, a stop for engagement by each arm when the valve is in closed position, a spring connected with each arm for holding the arm in contact with the stop, and a link connected with each arm and extending to a point near the driver's seat.

2. In an explosion engine, the combination with the manifold, a hot air pipe leading from a jacket around the exhaust pipe to the carbureter and having an extension for connection with the carbureter, the throttle valve in the said pipe between the carbureter and the manifold, a pipe leading horizontally from the fuel chamber of the carbureter below the level of the fuel in the said chamber, a reservoir for gasolene at the outer end of the pipe, said pipe having an elbow extending into the reservoir, a T interposed in the said pipe intermediate the ends thereof, a pipe connecting the T with the manifold at the junction of the branches with the body thereof, said pipe communicating with the said manifold, and a valve casing interposed in the horizontal pipe on each side of the T, a valve in each casing, an arm extending radially from each valve, a stop for engagement by each arm when the valve is in closed position, a spring connected with each arm for holding the arm in contact with the stop, and a link connected with each arm and extending to a point near the driver's seat.

3. In an explosion engine, the combination with the manifold, a hot air pipe leading from a jacket around the exhaust pipe to the carbureter and having an extension for connection with the carbureter, a throttle valve in the said pipe between the carbureter and the manifold, a pipe leading horizontally from the fuel chamber of the carbureter below the level of the fuel in the said chamber, a reservoir for gasolene at the outer end of the pipe, said pipe having an elbow extending into the reservoir, a T interposed in the said pipe intermediate the ends thereof, a pipe contacting the T with the manifold at the junction of the branches with the body thereof, said pipe communicating with the said manifold, a valve in the pipe on each side of the T, a spring normally holding each valve closed, and means for opening either valve.

4. In an explosion engine, the combination with the manifold, a carbureter communicating with the manifold, and a throttle valve for controlling the communication through the manifold, of a reservoir for gasolene, a pipe leading from the fuel chamber of the carbureter below the level of the fuel to the reservoir, a pipe leading from the first-named pipe intermediate the ends thereof to the manifold between the carbureter and the engine, a valve in the first-named pipe on each side of the last-named pipe, a spring normally holding each valve closed, and means for opening either valve.

5. In an explosion engine, the combination with the manifold, a carbureter communicating with the manifold, a throttle for controlling the connection through the manifold, of a reservoir for gasolene, a pipe leading from the fuel chamber of the carbureter below the level of the fuel to the reservoir, a pipe leading from the first-named pipe intermediate the ends thereof to the manifold between the carbureter and the engine, a valve in the first named pipe on each side of the last-named pipe, and means for opening either valve.

CHARLES KAUFMANN.

Witnesses:
D. N. KELLY,
SOPHIE POLMDORF.

Copies of this patent may be obtained for five cents each, by addressing the "Commissioner of Patents, Washington, D. C."